United States Patent Office 2,757,159
Patented July 31, 1956

2,757,159

MOISTURE-PROOFING OF POROUS MASONRY

Abraham I. Hormats, Baltimore, Md., assignor to Sta-Dri Inc., Odenton, Md., a corporation of Maryland No Drawing. Application October 14, 1953,
Serial No. 386,103

14 Claims. (Cl. 260—37)

This invention relates to the coating of porous masonry and, more particularly, to moistureproof coatings for porous masonry.

This application is a continuation-in-part of my co-pending application Serial No. 258,760 filed November 28, 1951.

Prior to the instant invention, masonry coatings have included Portland cement with or without lime as a base and a stearate, as ammonium or sodium stearates, as the waterproofing agent. The action of these stearates in these cement compositions is quite generally known in theory; these stearates, when mixed with the Portland cement-lime mixture, and later when combined with water, react with the calcium oxide in the cement-lime mixture to form the metallic salt calcium stearate, which is a water repellant; or the metallic salts are reduced to a fine powder and directly added to the cement-lime compound to theoretically obtain the water repelling properties in the applied and dried coatings. In practice, however, it has been found that the water-repellent characteristics of such prior compositions are initially good but deteriorate with age. These prior coatings are relatively short-lived as to moistureproofing characteristics and the purpose of these prior coatings is only served for a relatively short period.

It is an object of the invention to provide a moisture-proof coating of relatively permanent and long-lived characteristics.

It is a further object of the instant invention to provide a moistureproof coating having a Portland cement base in which the moistureproof characteristics are relatively permanent and long-lived.

It is still another object of the invention to provide a moistureproof masonry coating including a waterproofing agent in which there is substantially no chemical reaction between the waterproofing agent and the Portland cement base.

The invention generally has to do with the provision of a combined waterproofing material for masonry walls and the like including in dry powdered form a suitable cement base coating material, including a moistureproofing agent that has no affinity for water and serves to repel water and which agent is inert chemically to the remaining components of the composition but combines mechanically with the composition so that when the composition is suitably mixed with water and coated upon a masonry wall, a relatively permanent protection is effected. Not only may protective components be included in the composition, but pigments may also be included, and decorative pigments may be incorporated.

The present composition, in general, includes a major portion of an inorganic settable ingredient, such as Portland cement and lime or the like, and a minor proportion of a non-aqueous solution of a hydrocarbon substituted polysiloxane resin, more commonly known as silicone resins. Minor proportions of titanium dioxide or other pigments, hygroscopic salts, such as alkali metal and alkaline earth metal chlorides, and inert fillers may likewise be added.

The organo-siloxane resins have been found when completely condensed to have an empirical formula corresponding to the following type formula:

$$(R_m SiO_n)_x$$

where $x$ is an integer greater than one, R represents like and unlike radicals, monovalent alkyl or monovalent aryl, $m$ is a number less than 2 and not less than approximately .5, and $n$ is a number more than 1 and not more than approximately 1.75. The condensation of the polymers and copolymers is of the straight chain, heterocyclic and cross linked type and the silicon atoms are linked through the oxygen atoms, while the alkyl or aryl radicals are attached to the silicon atoms. These silicone resins are employed as a solution in the "B" or soluble resinous state dissolved in a non-aqueous organic solvent. After application to the masonry, these resins further condense.

The silicone resins of the desired R/Si ratio may be made by any of several processes, three of which are described on page 70 of the book "Chemistry of the Silicones" by E. G. Rochow (John Wiley & Sons, Inc., New York City, 1946).

The alkyl group may be methyl, ethyl, propyl, butyl and amyl. The larger alkyl groups cause the resin to cure more slowly and remain softer in consistency. If the larger groups are used, fewer are required to produce a resinous polymer of given flexibility and curing characteristics so that a butyl silicone roughly comparable to a methyl silicone in physical properties does not necessarily contain four times as much carbon. Benzyl silicone resins are classed as alkyl silicone resins because the phenyl group is attached through a $CH_2$ group to the silicon. Polybenzylsiloxane derived from the hydrolysis of benzyltrichlorosilane is a sticky soluble resin which gradually condenses further to an insoluble resin. Cyclohexyl silicone resins resemble benzyl silicone resins.

Phenyl silicone resins may be prepared having similar properties to the alkyl silicone resins. The hydrolysis product of phenyltrichlorosilane, for example, is a fusible resin highly cross-linked, whose melting point rises with continued heating. Xylyl and napthylsiloxanes are soluble glassy substances of polymeric character.

Mixtures of alkyl and aryl silicone resins are preferably prepared by attaching both alkyl and aryl groups to the same silicon atom rather than by mere admixture. The copolymer method has the advantage of flexibility for it permits various combinations of alkyl and aryl groups to be used in different proportions within a single polymeric structure. A wide range of properties may thus be obtained. A typical resin is methyl phenyl silicone which develops a good balance of flexibility, strength and infusibility. Another example is ethyl phenyl silicone resin. Other alkyl-aryl silicone resins may be prepared.

The solutions of silicone resins utilized in the present invention may be conveniently and effectively used to produce water-repellent masonry. The repellency produced is of a different order of magnitude and permanency than that produced by oils, waxes, stearates, or other types of organic resins previously utilized for this purpose.

The silicone resin solutions of the present invention may be of various concentrations, however, a concentration of 90% solids content in an aromatic hydrocarbon solvent has been found particularly advantageous. However, the General Electric resin No. DC 803 which has a 50% solid content has likewise been found satisfactory. The amount of silicone resin to be used should be within the range of 0.1% to 1% by weight of the composition in terms of weight of solids content.

The silicone resins referred to above are of a type well known in the art and methods of preparation are also disclosed in the following patents:

2,258,218—Rochow, Oct. 7, 1941
2,258,220—Rochow, Oct. 7, 1941
2,258,222—Rochow, Oct. 7, 1941
2,398,672—Sauer, Apr. 16, 1946
2,456,627—Doyle, Dec. 21, 1948

These resins are currently being manufactured and marketed by such firms as General Electric Co. and Dow-Corning Corp.

Although a Portland cement and lime base composition has been found to be preferable, other types of cement may be used as the base material, providing these other compositions, when coated on a masonry wall, such as cinder block, brick, stone, or the like, impart thereto some measure of impermeability toward moisture.

The inorganic settable material can likewise be a hydraulic, natural or aluminous cement, a gypsum, a plaster of Paris, calcium sulphate, lime or a similar calcium binder, or a magnesium oxychloride or other magnesium or magnesite or oxysalt composition.

The following example serves to illustrate, but is not intended to limit the present invention:

| | Parts by weight |
|---|---|
| Portland cement | 80 |
| Hydrated lime | 13.5 |
| Titanium dioxide | 3 |
| Calcium chloride | 3 |
| Hydrocarbon substituted polysiloxane resin solution (90% solids) | 0.5 |

The above dry ingredients were mixed together and milled or ground to a fine powder in a ball mill or hammer mill. One-fourth of this mixture was treated with the polysiloxane resin solution by spraying the solution into the powder while tumbling and with continued milling or grinding. This product is then blended with the remainder of the dry ingredients to form a powdered product. The resin used in the above example was Dow-Corning No. 129G.

In use, a small amount of water is added to the material with stirring until a paste consistency is obtained. Additional water is then added until equal parts by weight of water and the powdered material have been mixed and a paint-like consistency is attained. The resulting product may be applied to the masonry surface to be protected. After drying thereon, a water-proof surface is obtained that resists moisture and wetting for an indefinite period.

The proportions of the ingredients may be varied within the following ranges:

| | Percent by weight |
|---|---|
| Inorganic settable material | 75–99.9 |
| Inert fillers | 0–25 |
| Pigment | 0–3 |
| Hygroscopic salts | 0–5 |
| Hydrocarbon substituted polysiloxane resin solution [1] | 0.1–1 |

[1] Of the solid ingredient.

Hygroscopic salts in accordance with the present invention may be such common salts as sodium chloride and/or calcium chloride or other salts that are known to absorb and hold water during the curing of the cement.

Inert fillers which may likewise be added to the composition include silica flour, sand, calcium carbonate, asbestine, diatomaceous earth and the like.

The amount of the silicone resin solution added to the composition has been found to be critical. When more than 1% of the resin is added, it makes it very difficult to mix the composition with water since the resin prevents the wetting of the powder and the desired results are not obtained.

The present composition, over a long period of time, proved far superior as a moistureproofer for masonry than aluminum stearate. It is believed that the reasons for this superiority include the relationship of the inert quality of the silicone from a chemical point of view and its mechanical combination with the particles of the composition in such a way that the particles of the composition are themselves not affected, except as they are mechanically coated with the silicone so that the base particles form the structure which holds the water repellent "shields" of the silicone in the optimum relationship to the exposed surface to effectively repel moisture. To put it another way, the ideal moistureproof relationship is effected without chemical reacting with the base components.

It is significant that the quantity of the silicone resin used ranges from 0.1 to 1% of the dry composition, which is predominantly an inorganic settable material, like Portland cement and lime.

It will be obvious to those skilled in the art that various changes may be made without departing from the spirit of the invention and, therefore, the invention is not limited to what is described in the specification, but only as indicated in the appended claims.

What is claimed is:

1. A process of preparing a dry moistureproofing coating composition for porous masonry walls which composition is adapted to be mixed with water immediately prior to application to said walls comprising mixing a small amount of a solution of a hydrocarbon substituted polysiloxane resin in an aromatic hydrocarbon solvent with a predominate amount of an inorganic settable material, the weight of said resin being from 0.1 to 1% of the weight of the resulting composition, the solids content of said solution being at least 50% and blending said composition to yield a dry powdered product in which the particles of inorganic settable material are coated with the said resin.

2. A process in accordance with claim 1, wherein the inorganic settable material comprises 75 to 99.9% of the entire composition.

3. A process in accordance with claim 1, wherein the solids content of said solution is 90%.

4. A process of preparing a dry moistureproofing coating composition for porous masonry walls which composition is adapted to be mixed with water immediately prior to application to said walls comprising mixing a small amount of a solution of a hydrocarbon substituted polysiloxane resin in an aromatic hydrocarbon solvent with a mixture of 75 to 99.9% by weight of an inorganic settable material, up to 3% by weight of a pigment, up to 25% by weight of inert fillers, and up to 5% by weight of hygroscopic salts, the weight of said resin being from 0.1 to 1% of the weight of the resulting composition, the solids content of said solution being at least 50%, and blending said composition to yield a dry powdered product in which the particles of inorganic settable material are coated with the said resin.

5. A process of preparing a dry moistureproofing coating composition for porous masonry walls which composition is adapted to be mixed with water immediately prior to application to said walls comprising mixing a small amount of a solution of a hydrocarbon substituted polysiloxane resin in an aromatic hydrocarbon solvent with a mixture of 65–90% by weight of Portland cement, 10–25% by weight of lime, up to 3% by weight of pigment, and up to 5% by weight of hygroscopic salts, the weight of said resin being from 0.1 to 1% of the weight of the resulting composition, the solids content of said solution being at least 50%, and blending said composition to yield a dry powdered product in which the particles of inorganic settable material are coated with the said resin.

6. A process of preparing a dry moistureproofing coating composition for porous masonry walls which composition is adapted to be mixed with water immediately prior to application to said walls comprising mixing a small amount of a solution of a hydrocarbon substituted polysiloxane resin in an aromatic hydrocarbon solvent with a mixture of 80% by weight of Portland cement, 13.5% by weight of hydrated lime, 3% by weight of titanium dioxide, and 3% by weight of calcium chloride, the weight of said resin being 0.5% by weight of the entire resulting composition, the solids content of said solution being at least 50%, and blending said composition to yield a dry powdered product in which the particles of inorganic settable material are coated with the said resin.

7. A dry moistureproofing coating composition for porous masonry walls which composition is adapted to be mixed with water immediately prior to application to said walls comprising a predominate amount of an inorganic settable material in particulate form, said particles being coated with a small amount of a solution of a hydrocarbon substituted polysiloxane resin in an aromatic hydrocarbon solvent, the weight of said resin being from 0.1 to 1% of the weight of the resulting composition, the solids content of said solution being at least 50%.

8. A dry moistureproofing coating composition for porous masonry walls which composition is adapted to be mixed with water immediately prior to application to said walls comprising a mixture of 75 to 99.9% by weight of an inorganic settable material, up to 3% by weight of a pigment, up to 25% by weight of inert fillers, and up to 5% by weight of hygroscopic salts, said mixture being in particulate form, said particles being coated with a small amount of a solution of a hydrocarbon substituted polysiloxane resin in an aromatic hydrocarbon solvent, the weight of said resin being from 0.1 to 1% of the weight of the resulting composition, the solids content of said solution being at least 50%.

9. A dry moistureproofing coating composition for porous masonry walls which composition is adapted to be mixed with water immediately prior to application to said walls comprising a mixture of 65 to 90% by weight of Portland cement, 10 to 25% by weight of lime, up to 3% by weight of pigment, and up to 5% by weight of hygroscopic salts, said mixture being in particulate form, said particles being coated with a small amount of a solution of a hydrocarbon substituted polysiloxane resin in an aromatic hydrocarbon solvent, the weight of said resin being from 0.1 to 1% of the weight of the resulting composition, the solids content of said solution being at least 50%.

10. A dry moistureproofing coating composition for porous masonry walls which composition is adapted to be mixed with water immediately prior to application to said walls comprising a mixture of 80% by weight of Portland cement, 13.5% by weight of hydrated lime, 3% by weight of titanium dioxide and 3% by weight of calcium chloride, said mixture being in particulate form, said particles being coated with a small amount of a solution of a hydrocarbon substituted polysiloxane resin in an aromatic hydrocarbon solvent, the weight of said resin being from 0.1 to 1% by weight of the resulting composition, the solids content of said solution being at least 50%.

11. A process of rendering porous masonry water-repellent including the steps of applying to said masonry a liquid consisting of approximately equal parts of water and of a dry moistureproofing coating composition comprising a predominate amount of inorganic settable material in particulate form, said particles being coated with a small amount of a solution of a hydrocarbon substituted polysiloxane resin in an aromatic hydrocarbon solvent, the weight of said resin being from 0.1 to 1% of the weight of the composition, the solids content of said solution being at least 50%, and permitting the so treated masonry to air dry.

12. A process of rendering porous masonry water-repellent including the steps of applying to said masonry a liquid consisting of approximately equal parts of water and of a dry moistureproofing coating composition comprising a mixture of 75 to 99.9% by weight of an inorganic settable material, up to 3% by weight of a pigment, up to 25% by weight of inert fillers, and up to 5% by weight of hygroscopic salts, said mixture being in particulate form, said particles being coated with a small amount of a solution of a hydrocarbon substituted polysiloxane resin in an aromatic hydrocarbon solvent, the weight of said resin being from 0.1 to 1% of the weight of the resulting composition, the solids content of said solution being at least 50%, and permitting the so treated masonry to air dry.

13. A process of rendering porous masonry water-repellent including the steps of applying to said masonry a liquid consisting of approximately equal parts of water and of a dry moistureproofing coating composition comprising a mixture of 65 to 90% by weight of Portland cement, 10 to 25% by weight of lime, up to 3% by weight of pigment, and up to 5% by weight of hygroscopic salts, said mixture being in particulate form, said particles being coated with a small amount of a solution of a hydrocarbon substituted polysiloxane resin in an aromatic hydrocarbon solvent, the weight of said resin being from 0.1 to 1% of the weight of the resulting composition, the solids content of said solution being at least 50%, and permitting the so treated masonry to air dry.

14. A process of rendering porous masonry water-repellent including the steps of applying to said masonry a liquid consisting of approximately equal parts of water and of a dry moistureproofing coating composition comprising a mixture of 80% by weight of Portland cement, 13.5% by weight of hydrated lime, 3% by weight of titanium dioxide and 3% by weight of calcium chloride, said mixture being in particulate form, said particles being coated with a small amount of a solution of a hydrocarbon substituted polysiloxane resin in an aromatic hydrocarbon solvent, the weight of said resin being from 0.1 to 1% by weight of the resulting composition, the solids content of said solution being at least 50%, and permitting the so treated masonry to air dry.

References Cited in the file of this patent

UNITED STATES PATENTS

| | | |
|---|---|---|
| 2,491,487 | Faulwetter | Dec. 20, 1949 |
| 2,588,828 | Greiner | Mar. 11, 1952 |

OTHER REFERENCES

Silicone Cement Paint, Chem. Eng. 60, page 266 (May, 1953).